United States Patent
Saito et al.

(10) Patent No.: US 10,260,793 B2
(45) Date of Patent: Apr. 16, 2019

(54) DAMPER DEVICE

(71) Applicant: NIDEC SANKYO CORPORATION, Nagano (JP)

(72) Inventors: Shunji Saito, Nagano (JP); Katsuhiko Hayashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 378 days.

(21) Appl. No.: 15/307,001

(22) PCT Filed: Apr. 22, 2015

(86) PCT No.: PCT/JP2015/062196
§ 371 (c)(1),
(2) Date: Oct. 27, 2016

(87) PCT Pub. No.: WO2015/166853
PCT Pub. Date: Nov. 5, 2015

(65) Prior Publication Data
US 2017/0045283 A1    Feb. 16, 2017

(30) Foreign Application Priority Data
Apr. 30, 2014    (JP) ................................. 2014-094162

(51) Int. Cl.
*F16K 31/04*    (2006.01)
*F25D 17/04*    (2006.01)
(Continued)

(52) U.S. Cl.
CPC ............. *F25D 17/045* (2013.01); *F16H 1/06* (2013.01); *F16H 27/08* (2013.01); *F16H 55/08* (2013.01);
(Continued)

(58) Field of Classification Search
CPC .......... F25D 17/045; F25D 17/08; F16H 1/06; F16H 27/08; F16H 55/08; F16K 31/53; F16K 31/04–31/055
(Continued)

(56) References Cited

U.S. PATENT DOCUMENTS 4,595,081 A * 6/1986 Parsons ...................... F03G 1/08
251/129.11
4,669,578 A * 6/1987 Fukamachi ........... F16K 31/043
251/71
(Continued)

FOREIGN PATENT DOCUMENTS

| JP | 2003240102 | 8/2003 |
|----|------------|--------|
| JP | 2007292381 | 11/2007 |
| JP | 2012112610 | 6/2012 |

OTHER PUBLICATIONS

"Search Report of Europe Counterpart Application", dated Dec. 6, 2017, p. 1-p. 6.
(Continued)

*Primary Examiner* — John Bastianelli
(74) *Attorney, Agent, or Firm* — JCIPRNET

(57) ABSTRACT

A damper apparatus possible to suppress abnormal sounds immediately after the locking of gears has been released is provided. In a first lock mechanism of the damper apparatus, a first arcuate outer-peripheral part peripherally adjacent to a teeth-missing gear in a drive gear enters a portion of a plurality of teeth in which some teeth are narrowed in the axial direction to restrain a sector gear, the teeth being meshed with the drive gear in the sector gear. In the tooth nearest to the first arcuate outer-peripheral part in the teeth-missing gear, the curvature of a first tooth flank on the side opposite the first arcuate outer-peripheral part is less than the curvature of a second tooth flank on the first arcuate outer peripheral part side, and the tooth has a curved surface (Continued)

continuous from the first tooth flank to the second tooth flank.

21 Claims, 7 Drawing Sheets

(51) Int. Cl.
| | | |
|---|---|---|
| *F16K 31/53* | (2006.01) | |
| *F16H 1/06* | (2006.01) | |
| *F16H 27/08* | (2006.01) | |
| *F16H 55/08* | (2006.01) | |
| *F25D 17/08* | (2006.01) | |

(52) U.S. Cl.
CPC .............. *F16K 31/04* (2013.01); *F16K 31/53* (2013.01); *F25D 17/08* (2013.01)

(58) Field of Classification Search
USPC .... 251/129.11–129.13, 248, 250.5, 284, 298
See application file for complete search history.

(56) References Cited

U.S. PATENT DOCUMENTS

| | | | | |
|---|---|---|---|---|
| 5,876,014 A | * | 3/1999 | Noritake | ............... F16K 31/041 |
| | | | | 251/129.12 |
| 6,244,564 B1 | * | 6/2001 | Noritake | ............... F16K 31/043 |
| | | | | 251/129.11 |
| 8,561,645 B2 | * | 10/2013 | Leroux | .................. F02M 26/06 |
| | | | | 251/250.5 |

OTHER PUBLICATIONS

"International Search Report (Form PCT/ISA/210) of PCT/JP2015/062196", dated Jul. 14, 2015, with English translation thereof, pp. 1-3.

* cited by examiner

DAMPER DEVICE

CROSS-REFERENCE TO RELATED APPLICATION

This application is a 371 application of the International PCT application serial no. PCT/JP2015/062196, filed on Apr. 22, 2015, which claims priority benefits of Japan Patent Application No. 2014-094162, filed on Apr. 30, 2014. The entirety of each of the above- mentioned patent applications is hereby incorporated by references herein and made a part of this specification.

TECHNICAL FIELD

The disclosure relates to a damper device which is used in a cold air passage of a refrigerator or the like.

BACKGROUND ART

In a damper device which is used in a cold air passage of a refrigerator or the like, a structure has been proposed in which a baffle is turnably driven by, for example, a drive mechanism including a stepping motor and a gear train to open and close an opening part formed in a frame (see Patent Literature 1). Further, in the damper device described in Patent Literature 1, a lock mechanism for maintaining a posture of the baffle is provided between a drive gear and a sector gear used in the gear train. In the lock mechanism, a circular arc-shaped outer peripheral part of the drive gear is entered to portions whose dimensions in an axial line direction are narrowed of a second and a third teeth from one end in a circumferential direction in a plurality of the teeth of the sector gear and thereby the sector gear is restricted.

CITATION LIST

Patent Literature

[Patent Literature 1] Japanese Patent Laid-Open No. 2003-240102

SUMMARY OF THE DISCLOSURE

Technical Problem

However, for example, in a case that a baffle is started to drive in an open direction from a state that the baffle is held in a closing posture by the lock mechanism described in Patent Literature 1, when an urging force is acted on the baffle in the open direction, the teeth of the sector gear having been pressure-contacted and restricted by the circular arc-shaped outer peripheral part of the drive gear are rapidly released. Therefore, the sector gear is turned rapidly and the members are strongly contacted with each other and, as a result, an abnormal noise is occurred.

In view of the problem described above, the disclosure provides a damper device which is capable of restraining occurrence of an abnormal noise just after a locking state of the gears is released.

Means to Solve the Problems

To solve the above mentioned problem, the disclosure provides a damper device including a frame in which an opening part is formed, a baffle configured to open and close the opening part, a drive mechanism structured to drive the baffle, and a case which accommodates the drive mechanism. The drive mechanism includes a stepping motor and a gear train structured to transmit rotation of the stepping motor, and the gear train includes a drive gear and a sector gear engaged with the drive gear and driven by the drive gear. A first lock mechanism is structured between the drive gear and the sector gear at a movement restricted position in one of a closing direction and an open direction of the baffle, and the first lock mechanism prevents turning of the sector gear to the other of the closing direction and the open direction of the baffle. The first lock mechanism is structured so that a first circular arc-shaped outer peripheral part of the drive gear concentrically formed so as to have the same or larger diameter than a tooth tip circle of a partially toothless gear engaged with the sector gear and disposed at a position adjacent in a circumferential direction to the partially toothless gear is entered into a portion of a tooth whose dimension in an axial line direction is narrowed of a plurality of teeth of the sector gear engaged with the drive gear and thereby the sector gear is restricted. In addition, a tooth on the most first circular arc-shaped outer peripheral part side of the partially toothless gear is formed so that a curvature of a first tooth face on an opposite side to the first circular arc-shaped outer peripheral part side is smaller than a curvature of a second tooth face on the first circular arc-shaped outer peripheral part side.

In the disclosure, a first lock mechanism is structured at a movement restricted position in one of a closing direction and an open direction of the baffle for preventing turning of the sector gear and thus the baffle is hard to be displaced from a stopped state. Further, in the disclosure, the first lock mechanism is structured so that the first circular arc-shaped outer peripheral part of the drive gear adjacent to the partially toothless gear is entered to the portion of a tooth whose dimension in the axial line direction is narrowed of the sector gear and thereby the sector gear is restricted. In the disclosure, a tooth on the most first circular arc-shaped outer peripheral part side of the partially toothless gear is formed so that a curvature of a first tooth face on an opposite side to the first circular arc-shaped outer peripheral part side is smaller than a curvature of a second tooth face on the first circular arc-shaped outer peripheral part side. Therefore, a tooth of the sector gear which is pressure-contacted and restricted by the first circular arc-shaped outer peripheral part of the drive gear is gradually released from the drive gear when the baffle is started to drive to the other direction. Accordingly, even when an urging force is acted on the baffle in the other direction, the sector gear is turned gradually and thus occurrence of an abnormal noise caused by a collision between the members or the like can be restrained.

In the disclosure, it is preferable that a tooth face of the tooth on the most first circular arc-shaped outer peripheral part side of the partially toothless gear is formed in a continuously curved face from a side of the first tooth face to the second tooth face. According to this structure, the tooth of the sector gear which is pressure-contacted and restricted by the first circular arc-shaped outer peripheral part of the drive gear is gradually released from the drive gear. Therefore, even when an urging force is acted on the baffle in the other direction, the sector gear is turned gradually.

In the disclosure, it is preferable that the tooth face of the tooth on the most first circular arc-shaped outer peripheral part side of the partially toothless gear is formed in a continuously curved face from the side of the first tooth face to the first circular arc-shaped outer peripheral part. According to this structure, the tooth of the sector gear which is pressure-contacted and restricted by the first circular arc-shaped outer peripheral part of the drive gear is gradually released from the drive gear. Therefore, even when an urging force is acted on the baffle in the other direction, the sector gear is turned gradually.

In the disclosure, it may be structured that the first lock mechanism prevents turning of the sector gear at the movement restricted position in the closing direction of the baffle.

The disclosure is especially effective in the structure that a portion of the baffle contacting with the frame when the baffle sets the opening part in a closed state is made of an elastic member, and the elastic member is elastically deformed by contacting with the frame in a state that the opening part is closed by the baffle. In a case that the portion of the baffle contacted with the frame is made of an elastic member, an urging force in an open direction is applied to the baffle in a state that the opening part of the frame is closed by the baffle and thus, when the baffle is started to drive in an open direction, the sector gear is going to turn rapidly. However, according to the disclosure, the tooth face of the partially toothless gear is structured as described above and thus rapid turning of the sector gear can be restrained.

In the disclosure, it is preferable that a first stopper mechanism is structured between the drive gear and the case and the first stopper mechanism restricts a movable range in a first turning direction of the drive gear when the baffle is turned in the closing direction and, in the first lock mechanism, a dimension in an axial line direction of a tooth at the most end position in a circumferential direction of a plurality of teeth of the sector gear engaged with the drive gear is narrowed. According to this structure, the position where the first stopper mechanism is operated is set as a starting point and, when the baffle is driven in either direction of an open direction and a closing direction, a drive signal having the same number of steps is supplied to the stepping motor. Therefore, in a case that the opening part of the frame is to be set in a closed state by the baffle, even when the baffle is further driven in a closing direction from a state that the baffle is abutted with the frame, step-out of the stepping motor is hard to be occurred because the number of steps is set with the time point when the first stopper mechanism is operated as the starting point. Accordingly, a situation that the gears of the gear train are momentarily reversed is hard to be occurred due to step-out and thus an abnormal noise caused by a collision between the teeth can be restrained. Further, since the first stopper mechanism is provided, it is sufficient that the first lock mechanism prevents turning to one side direction of the sector gear. Therefore, it is sufficient that a dimension in the axial line direction of the tooth located on the most end position in a circumferential direction of the sector gear is narrowed and thus the portion for structuring the first lock mechanism in the sector gear can be narrowed. Accordingly, the size of the sector gear can be reduced.

In the disclosure, it is preferable that a second stopper mechanism which restricts a movable range in a second turning direction of the drive gear when the baffle is turned in the open direction, and the movable range of the baffle set in a range from a position where the first stopper mechanism is operated to a front position before the second stopper mechanism is operated. According to this structure, even in a case that the baffle is running out of control in an open direction, the run-away of the baffle can be prevented by the second stopper mechanism. Further, normally, the number of steps of the stepping motor is set at a front position before the second stopper mechanism is operated and thus a situation is hard to be occurred that the second stopper mechanism is operated to cause step-out of the stepping motor.

In the disclosure, it is preferable that a second lock mechanism is structured between the drive gear and the sector gears for holding the sector gear in a stopped state at the front position and the second lock mechanism is structured so that a second circular arc-shaped outer peripheral part of the drive gear concentrically formed so as to have the same or larger diameter than the tooth tip circle of the partially toothless gear engaged with the sector gear and disposed at a position adjacent in the circumferential direction to the partially toothless gear is entered into a portion of a tooth whose dimension in an axial line direction is narrowed of a plurality of teeth of the sector gear engaged with the drive gear and thereby the sector gear is restricted. Therefore, the baffle in the open posture can be restrained from flapping due to fluid pressure.

In the disclosure, it is preferable that the drive gear is formed with a circular arc-shaped protruded part on an opposite side to a side having teeth of the partially toothless gear, the circular arc-shaped protruded part is connected from the first circular arc-shaped outer peripheral part to the second circular arc-shaped outer peripheral part, and an outer peripheral face of the circular arc-shaped protruded part is provided with the same or larger diameter than the tooth tip circle of the partially toothless gear and formed concentrically with the tooth tip circle.

In the disclosure, the sector gear is, for example, an output gear connected with the baffle.

In the disclosure, it is preferable that an imaginary line which connects a turning center position of the drive gear and a turning center position of the sector gear is obliquely extended for all of four side plate parts of the case which surround the drive mechanism. According to this structure, the drive gear can be disposed corresponding to the shape of the sector gear and thus a space required to provide the drive mechanism can be narrowed. Therefore, the size of the case can be reduced.

In the disclosure, it is preferable that a pitch circle radius of a large diameter gear of a first gear engaged with a motor pinion of the stepping motor is set so that a length obtained by adding a pitch circle radius of the motor pinion to the pitch circle radius of the large diameter gear of the first gear is larger than a length obtained by adding a radius of the stepping motor and a pitch circle radius of a small diameter gear of the first gear. According to this structure, when viewed in turning center axial line directions of the stepping motor and the first gear, the rotation center shaft of the first gear is not overlapped with the stepping motor. Therefore, a rotation shaft of the first gear and a support shaft rotatably supporting the first gear can be easily disposed.

Effects of the Disclosure

In the disclosure, a first lock mechanism is structured at a movement restricted position in one of a closing direction and an open direction of the baffle for preventing turning of the sector gear and thus the baffle is hard to be displaced from a stopped state. Further, in the disclosure, in the first lock mechanism, the first circular arc-shaped outer peripheral part of the drive gear adjacent to the partially toothless gear is entered to a portion of a tooth whose dimension in the axial line direction is narrowed of the sector gear and thereby the sector gear is restricted. In this case, a tooth on the most first circular arc-shaped outer peripheral part side of the partially toothless gear is formed so that a curvature of a first tooth face on an opposite side to the first circular arc-shaped outer peripheral part side is smaller than a curvature of a second tooth face on the first circular arc-shaped outer peripheral part side. Therefore, a tooth of the sector gear which is pressure-contacted and restricted by the first circular arc-shaped outer peripheral part of the drive gear is gradually released from the drive gear when the baffle is started to drive in the other direction. Accordingly, even when an urging force is acted on the baffle in the other direction, the sector gear is turned gradually and thus occurrence of an abnormal noise caused by a collision between the members or the like can be restrained.

DESCRIPTION OF EMBODIMENTS

A damper device for a refrigerator to which the disclosure is applied will be described below with reference to the accompanying drawings. In the following descriptions, a turning center axial line of a baffle 4 is referred to as an "L", a direction along the turning center axial line "L" is referred to as an "X" direction, a direction in which an opening part faces is referred to as a "Z" direction, and a direction perpendicular to the "X" direction and the "Z" direction is referred to as a "Y" direction. Further, one side in the "X" direction is referred to as "X1", the other side in the "X" direction is referred to as "X2", one side in the "Y" direction is "Y1", the other side in the "Y" direction is "Y2", one side in the "Z" direction is "Z1", and the other side in the "Z" direction is "Z2". Further, in the following descriptions, the turning center axial line "L" is set in a horizontal direction, one side "Y1" in the "Y" direction is a lower side in a gravity direction, and the other side "Y2" in the "Y" direction is an upper side in the gravity direction.

(Entire Structure)

Figure 1A:
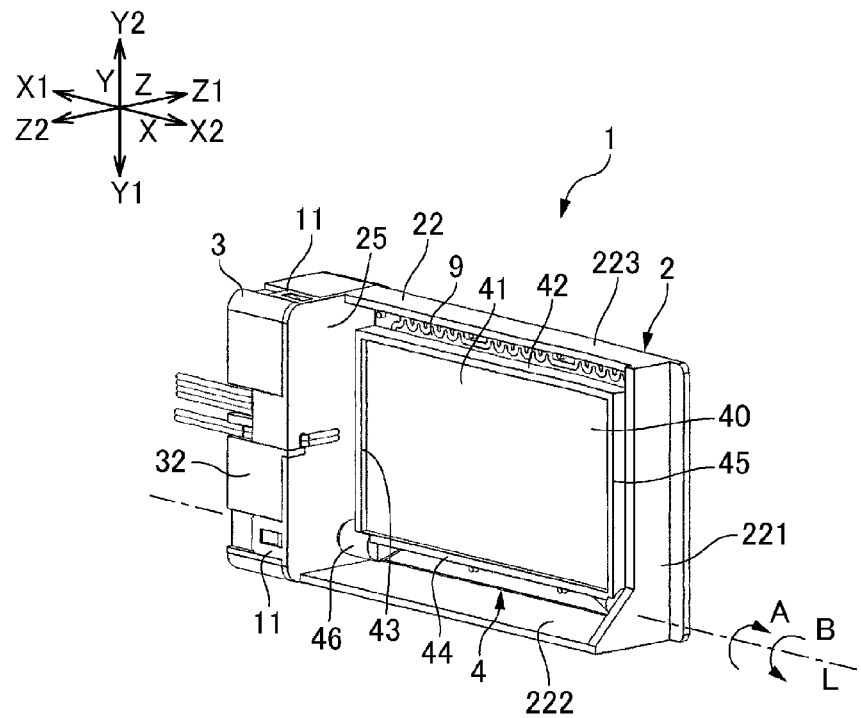
FIGS. 1(a) and 1(b) are explanatory views showing a damper device to which the disclosure is applied.
Figure 1B:
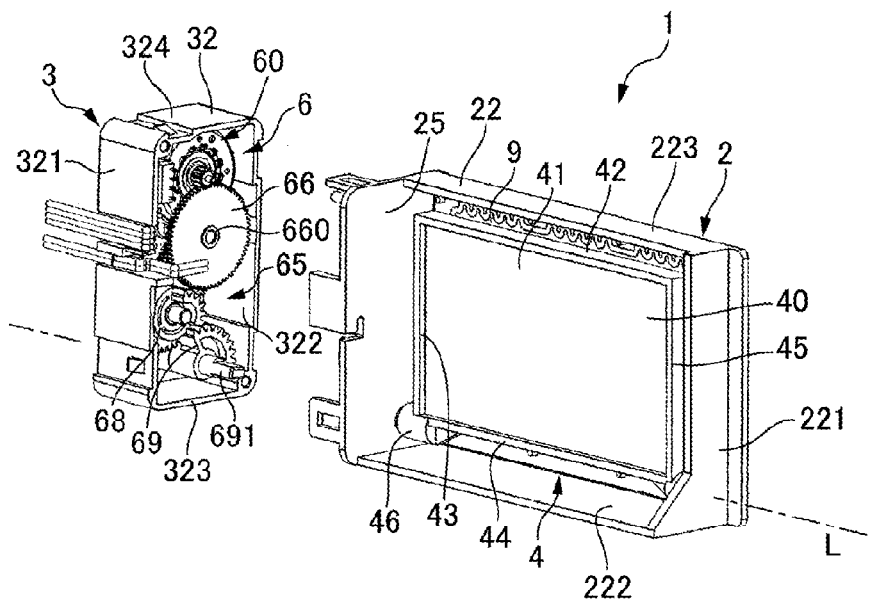
Figure 2:
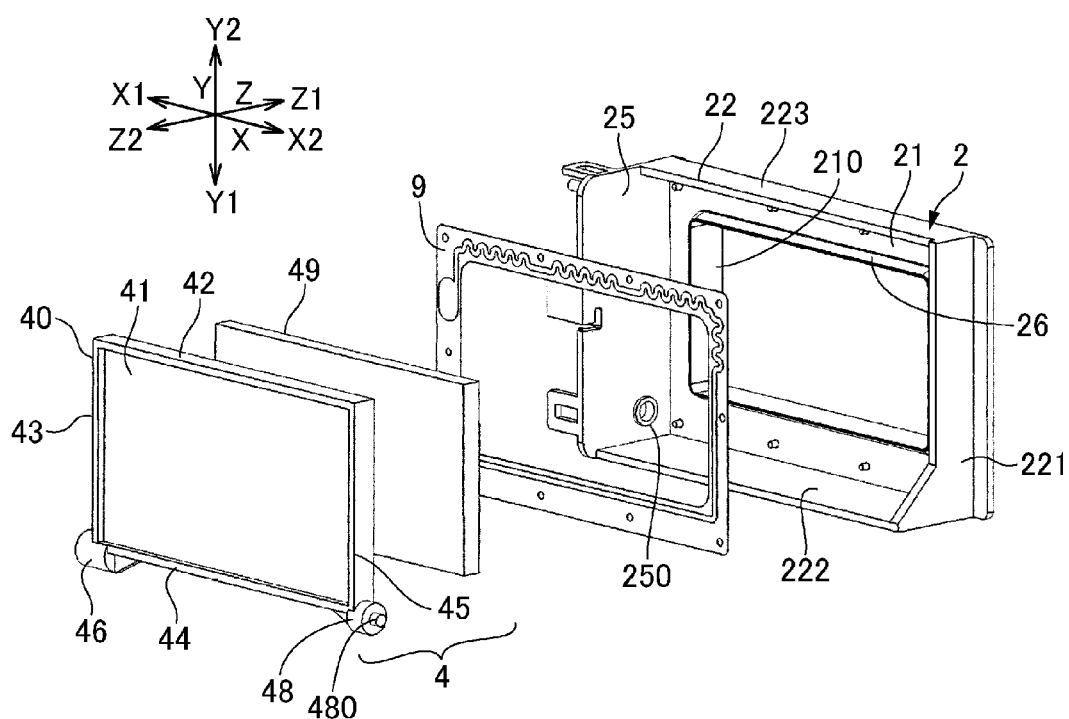
FIG. 2 is an exploded perspective view showing a baffle and the like used in a damper device to which the disclosure is applied.

FIGS. 1(a) and 1(b) are explanatory views showing a damper device 1 to which the disclosure is applied. FIG. 1(a) is a perspective view which is viewed from a side where a baffle 4 is disposed with respect to an opening part 210, and FIG. 1(b) is its exploded perspective view. FIG. 2 is an exploded perspective view showing a baffle 4 and the like used in the damper device 1 to which the disclosure is applied. FIGS. 1(a) and 1(b) and FIG. 2 show a state that the opening part 210 is set in a closed state by the baffle 4.

As shown in FIGS. 1(a) and 1(b) and FIG. 2, a damper device 1 in this embodiment includes a frame 2 in which a rectangular opening part 210 (see FIG. 2) is formed, a case 3 which accommodates a drive mechanism 6 in its inside, and a baffle 4 for opening and closing the opening part 210 of the frame 2. The case 3 and the frame 2 are connected with each other by a hook mechanism 11 or the like.

The frame 2 is provided with a rectangular end plate part 21 in which the opening part 210 is formed, and a body part 22 in a rectangular tube shape which is protruded to the other side "Z2" in the "Z" direction from an outer side edge of the end plate part 21. The body part 22 is provided with a side plate part 221 on an opposite side to the case 3, a connecting plate part 25 facing the side plate part 221 on the case 3 side, and side plate parts 222 and 223 which connect the side plate part 221 with the connecting plate part 25. The connecting plate part 25 is protruded to the other side "Z2" in the "Z" direction with respect to the side plate parts 221, 222 and 223 and is connected with the case 3.

A seal plate part 26 in a rectangular tube shape is formed in the end plate part 21 so as to protrude from an edge of the opening part 210 toward a side where the baffle 4 is located. The baffle 4 is abutted with the seal plate part 26 and thereby the opening part 210 is set in a closed state. Further, a sheet-shaped heater 9 is attached to a face of the end plate part 21 on the side where the baffle 4 is located so as to surround the opening part 210 (surrounding the seal plate part 26).

In this embodiment, a drive mechanism 6 turns the baffle 4 around the turning center axial line "L" extended in the "X" direction (horizontal direction) to open and close the opening part 210. The drive mechanism 6 changes a posture of the baffle 4 between a closing posture, which is obtained by turning the baffle 4 in a closing direction as shown by the arrow "A" with the turning center axial line "L" as a turning center to close the opening part 210 by the baffle 4, and an open posture which is obtained by turning the baffle 4 in an open direction as shown by the arrow "B" with the turning center axial line "L" as a turning center to open the opening part 210.

The damper device 1 is disposed on an inner side of a duct structuring a cold air passage. Cold air is flowed through the opening part 210 from a side opposite to a side where the baffle 4 is disposed with respect to the opening part 210. Alternatively, cold air may be flowed through the opening part 210 from a side where the baffle 4 is disposed with respect to the opening part 210. In this embodiment, cold air is flowed through the opening part 210 from a side opposite to a side where the baffle 4 is disposed with respect to the opening part 210.

(Structure of Baffle 4)

The baffle 4 includes an opening/closing (opening and closing) plate 40 having a flat plate part 41 whose size is larger than the opening part 210, and a sheet-shaped elastic member 49 which is stuck on a face on an opening part 210 side of the opening/closing plate 40 and is made of foamed polyurethane or the like. The elastic member 49 is abutted with the periphery of the opening part 210 (seal plate part 26) and closes the opening part 210. A face of the opening/closing plate 40 on an opposite side to the opening part 210 of the flat plate part 41 is formed with ribs 42, 43, 44 and 45 extended along an outer side edge of the baffle 4.

The baffle 4 is provided with a shaft part 46 protruded toward one side "X1" in the "X" direction on a side where the rib 44 is located in the flat plate part 41. The shaft part 46 is coaxially formed with the turning center axial line "L". The shaft part 46 is turnably supported by a hole 250 formed in the connecting plate part 25 of the frame 2 and is connected with the drive mechanism 6 in this state. Further, the baffle 4 is provided with a shaft part 48 protruded toward the other side "X2" in the "X" direction on a side where the rib 44 is located in the flat plate part 41. A protruded part 480 which is turnably supported by the frame 2 is protruded from the shaft part 48 toward the other side "X2" in the "X" direction (outer side).

(Structure of Drive Mechanism 6)

Figure 3:
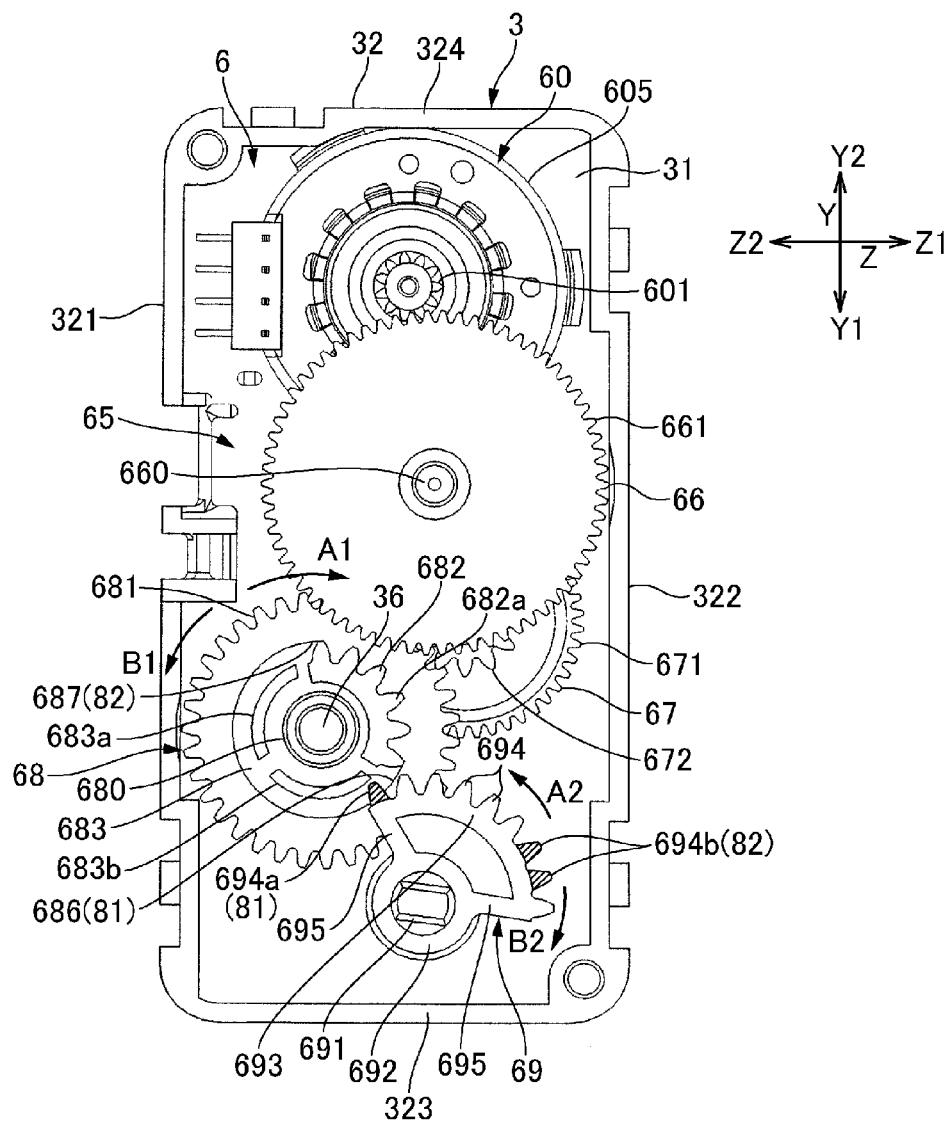
FIG. 3 is an explanatory view showing a drive mechanism of a damper device to which the disclosure is applied.

FIG. 3 is an explanatory view showing the drive mechanism 6 of the damper device 1 to which the disclosure is applied. FIG. 3 shows a closed state that the opening part 210 is set in a closed state by the baffle 4.

As shown in FIG. 3, the drive mechanism 6 includes a stepping motor 60 which is disposed on an inner side of the case 3 and a gear train 65 for transmitting rotation of the stepping motor 60 to the baffle 4 on an inner side of the case 3. The case 3 is provided with a bottom plate part 31 and a body part 32 in a rectangular tube shape which is protruded to a side of the frame 2 from the bottom plate part 31. The body part 32 is provided with side plate parts 321 and 322 facing in the "Z" direction and side plate parts 323 and 324 facing in the "Y" direction. The bottom plate part 31 and the body part 32 are formed in a quadrangular shape whose long side is extended in the "Y" direction and its short side is extended in the "Z" direction when viewed in the "X" direction. The stepping motor 60 is held by the case 3 between the frame 2 and the case 3.

The gear train 65 includes a first gear 66 provided with a large diameter gear 661 engaged with a motor pinion 601, a second gear 67 provided with a large diameter gear 671 engaged with a small diameter gear (not shown) of the first gear 66, and a drive gear 68 provided with a large diameter gear 681 engage with a small diameter gear 672 of the second gear 67. Therefore, in the gear train 65, the first gear 66, the second gear 67 and the drive gear 68 structure a reduction gear train. Further, the gear train 65 includes a sector gear 69 which is engaged with the drive gear 68 and is driven by the drive gear 68. The sector gear 69 is a final gear (output gear) located in the last stage of the gear train 65 and is connected with the baffle 4. In this embodiment, the second gear 67, the drive gear 68 and the sector gear 69 are turnably supported by the bottom plate part 31 of the case 3.

In this embodiment, a pitch circle radius of the large diameter gear 661 of the first gear 66 is set so that a length obtained by adding the pitch circle radius of the large diameter gear 661 to a pitch circle radius of the motor pinion 601 is larger than a length obtained by adding a radius of the stepping motor 60 and a pitch circle radius of the small diameter gear (not shown) of the first gear. Therefore, when viewed in the turning center axial line directions of the stepping motor 60 and the first gear 66, the small diameter gear (not shown) of the first gear 66 is not overlapped with an outer diameter of the stepping motor 60. Accordingly, for example, a rotation shaft of the first gear 66 and its support shaft are not required to be supported by a main body part 605 or the like of the stepping motor 60 and thus a structure for rotatably disposing the first gear 66 can be simplified. Further, since an outer diameter of the first gear 66 is large, the number of gears for structuring the deceleration mechanism in the gear train 65 can be reduced. In this embodiment, both ends of a rotation shaft 660 of the first gear 66 are supported by the bottom plate part 31 of the case 3 and the connecting plate part 25 of the frame 2 on one side in the "Y" direction with respect to the main body part 605 of the stepping motor 60.

(Detailed Structure of Drive Gear 68 and the Like)

FIGS. 4(a), 4(b) and 4(c) are explanatory views showing structures of the drive gear 68, the sector gear 69 and the like which are used in the drive mechanism 6 of the damper device 1 to which the disclosure is applied. FIG. 4(a) is a perspective view showing a state that the drive gear 68 and the sector gear 69 are supported in the case 3 which is viewed from the other side "X2" in the "X" direction (from a side where the frame 2 is disposed). FIG. 4(b) is an exploded perspective view showing a state that the drive gear 68 and the sector gear 69 are detached from the case 3 which is viewed from the other side "X2" in the "X" direction (from a side where the frame 2 is disposed). FIG. 4(c) is a perspective view showing the drive gear 68 and the sector gear 69 viewed from one side "X1" in the "X" direction (from an opposite side to the frame 2). FIG. 5 is an explanatory view showing a first stopper mechanism 71 structured in the drive mechanism 6 of the damper device 1 to which the disclosure is applied and FIG. 5 is a "YZ" cross-sectional view in which the drive gear 68 and the like is cut at a position where a stopper protruded part 39 is formed.

FIGS. 4(a), 4(b) and 4(c) and FIG. 5 show a state that the baffle 4 sets the opening part 210 in a closed state. Further, in the following descriptions, a turning direction of the drive gear 68 when the baffle 4 is driven in a closing direction is referred to as a first direction (direction as shown by the arrow "B1"), and a turning direction of the drive gear 68 when the baffle 4 is driven in an open direction is referred to as a second direction (direction as shown by the arrow "A1"). Further, a turning direction of the sector gear 69 when the baffle 4 is driven in a closing direction is indicated by the arrow "B2", and a turning direction of the drive gear 68 when the baffle 4 is driven in an open direction is indicated by the arrow "A2".

As shown in FIGS. 4(a) and 4(b), the bottom plate part 31 of the case 3 is formed with a tube part 37, which turnably supports the sector gear 69 near a corner of the side plate parts 322 and 323, and a stepped support shaft 36 which turnably supports the drive gear 68 at a position obliquely separated in the "Y" direction and the "Z" direction from the tube part 37. Therefore, an imaginary line which connects the turning center position of the drive gear 68 with the turning center position of the sector gear 69 is obliquely extended for all of four side plate parts 321, 322, 323 and 324 which surround the drive mechanism 6 in the case 3. In other words, the drive gear is provided at a preferable position corresponding to a shape of the sector gear 69. Therefore, a space required to provide the drive mechanism 6 is narrow and thus the size of the case 3 can be reduced.

In this embodiment, a stopper protruded part 39 extended in a circular arc shape with the support shaft 36 as a center is formed on a side with respect to the support shaft 36 in the bottom plate part 31 of the case 3. The stopper protruded part 39 structures a first stopper mechanism 71 and a second stopper mechanism 72 described below by contacting with the drive gear 68.

In other words, the stopper protruded part 39 is provided in the bottom plate part 31 of the case 3 and the drive gear 68 is provided with a protruded part 688 and a protruded part 689. The first stopper mechanism 71 is structured of the stopper protruded part 39 and the protruded part 689, and the second stopper mechanism 72 is structured of the stopper protruded part 39 and the protruded part 688.

As shown in FIG. 3 and FIGS. 4(a) and 4(b), the drive gear 68 is provided with a large diameter gear 681 formed of a spur gear around a shaft hole 680 to which the support shaft 36 formed in the case 3 is fitted, and a partially toothless gear 682 formed concentrically with the large diameter gear 681 on the other side "X2" in the "X" direction of the large diameter gear 681. In this embodiment, the partially toothless gear 682 is provided with a plurality of teeth 682a over an angular range of about 120°. Further, the drive gear 68 is formed with a circular arc-shaped protruded part 683 which is protruded from the large diameter gear 681 on the other side "X2" in the "X" direction of the large diameter gear 681 so as to be lower than a dimension in an axial line direction (tooth width) of the partially toothless gear 682. An outer peripheral face of the arc-shaped protruded part 683 is provided with the same as or larger diameter than a tooth tip circle of the partially toothless gear 682 and is formed concentric with the tooth tip circle. Alternatively, it may be structured that the outer peripheral face of the circular arc-shaped protruded part 683 is extended in a radial direction to a position where turning of the sector gear 69 is not disturbed. Further, the circular arc-shaped protruded part 683 is formed with slits 683a and 683b which are opened at an end face on the other side "X2" in the "X" direction.

In the outer peripheral face of the circular arc-shaped protruded part 683 structured as described above, an end part in the first direction shown by the arrow "B1" is a first circular arc-shaped outer peripheral part 686 which structures a first lock mechanism 81 described below together with the case 3, and an end part in the second direction shown by the arrow "A1" is a second circular arc-shaped outer peripheral part 687 which structures a second lock mechanism 82 described below together with the case 3.

As shown in FIG. 4(c) and FIG. 5, in the drive gear 68, a circular ring-shaped protruded part 684a is formed along an outer peripheral edge on one side "X1" in the "X" direction of the large diameter gear 681, and an circular ring-shaped protruded part 684b is formed along an inner peripheral edge so as to be concentric with the protruded part 684a.

A protruded part 688 extended in a radial direction so as to connect the protruded parts 684a and 684b with each other is formed between the protruded part 684a and the protruded part 684b, and a protruded part 689 extended in the radial direction so as to connect the protruded parts 684a and 684b with each other is formed at a position separated in a circumferential direction from the protruded part 688. In this embodiment, the protruded part 689 is formed at an angular position of about 150° from the protruded part 688 toward the first direction shown by the arrow "B1" and, as a result, the protruded part 688 is formed at an angular position of about 210° from the protruded part 689 toward the first direction shown by the arrow "B1".

In this embodiment, a recessed part 685 surrounded by the protruded parts 684a, 684b, 688 and 689 is utilized as a stopper arrangement space which is provided in a wider angular range between the protruded part 688 and the protruded part 689 in the circumferential direction (angular range of about 210° toward the first direction shown by the arrow "A1" from the protruded part 688). In other words, when the support shaft 36 of the case 3 is fitted into the shaft hole 680 of the drive gear 68, the stopper protruded part 39 formed in the bottom plate part 31 of the case 3 is located in an inside of the recessed part 685.

Therefore, when the drive gear 68 is turned toward the first direction shown by the arrow "B1", the protruded part 689 is abutted with the stopper protruded part 39 and the first stopper mechanism 71 which prevents further turning of the drive gear 68 is operated. On the other hand, when the drive gear 68 is turned toward the second direction shown by the arrow "A1", the protruded part 688 is abutted with the stopper protruded part 39 and the second stopper mechanism 72 which prevents further turning of the drive gear 68 is operated.

(Detailed Structure of Sector Gear 69)

As shown in FIG. 3 and FIGS. 4(a), 4(b) and 4(c), the sector gear 69 is provided with a shaft part 690 which is fitted into the tube part 37 formed in the case 3 and an output shaft 691 formed on the other side in the "X" direction with respect to the shaft part 690. The output shaft 691 is formed with flat face parts at positions facing each other and, on the other hand, a recessed part (not shown) having an opening part corresponding to a cross-sectional shape of the output shaft 691 is formed on a case 3 side of the shaft part 46 of the baffle 4 as described with reference to FIGS. 1(a) and 1(b) and FIG. 2. Therefore, when the output shaft 691 is fitted into the recessed part formed in the shaft part 46 of the baffle 4, turning of the output shaft 691 is transmitted to the baffle 4.

In the sector gear 69, a column part 692 whose outer diameter is larger than the shaft part 690 and the output shaft 691 is formed between the shaft part 690 and the output shaft 691. A plurality of teeth 694 is formed along an outer peripheral face of a circular arc part 693 which is formed on an outer peripheral side of the column part 692. In this embodiment, reinforcing plates 695 are formed between both ends of the circular arc part 693 and the column part 692.

In a plurality of the teeth 694 arranged in a circumferential direction of the sector gear 69, the tooth 694a located on the most end position in the direction shown by the arrow "A2" is formed narrower in a dimension in an axial line direction (tooth width) than the adjacent teeth 694. Further, in the plurality of the teeth 694 arranged in the circumferential direction of the sector gear 69, the second and the third teeth 694b from the most end tooth in a direction shown by the arrow "B2" are formed narrower in a dimension in the axial line direction (tooth width) than the adjacent teeth 694.

In the teeth 694a and 694b, a space formed by making a tooth width of the tooth 694a narrow is a space into which the first circular arc-shaped outer peripheral part 686 of the drive gear 68 is entered to structure the first lock mechanism 81 together with the drive gear 68 as described below. Further, a space formed by making a tooth width of the tooth 694b narrow is a space into which the second circular arc-shaped outer peripheral part 687 of the drive gear 68 is entered to structure the second lock mechanism 82 together with the drive gear 68 as described below.

(Structures of First Stopper Mechanism 71 and First Lock Mechanism 81)

In the damper device 1 in this embodiment, when the drive gear 68 is turned in the first direction shown by the arrow "B1", the sector gear 69 is turned in the direction shown by the arrow "B2" and the baffle 4 is turned in a closing direction. On the other hand, when the drive gear 68 is turned in the second direction shown by the arrow "A1", the sector gear 69 is turned in the direction shown by the arrow "A2" and the baffle 4 is turned in an open direction.

In this embodiment, the first stopper mechanism 71 which restricts a movable range in the first turning direction (direction shown by the arrow "B1") of the drive gear 68 when the baffle 4 is turned in a closing direction is structured between the drive gear 68 and the case 3. Further, the first lock mechanism 81 is structured between the drive gear 68 and the sector gear 69 by which, in a state that the first stopper mechanism 71 is operated, turning of the sector gear 69 in a direction that the baffle 4 is going to turn in an open direction (turning in a direction shown by the arrow "A2") is prevented.

Figure 4:
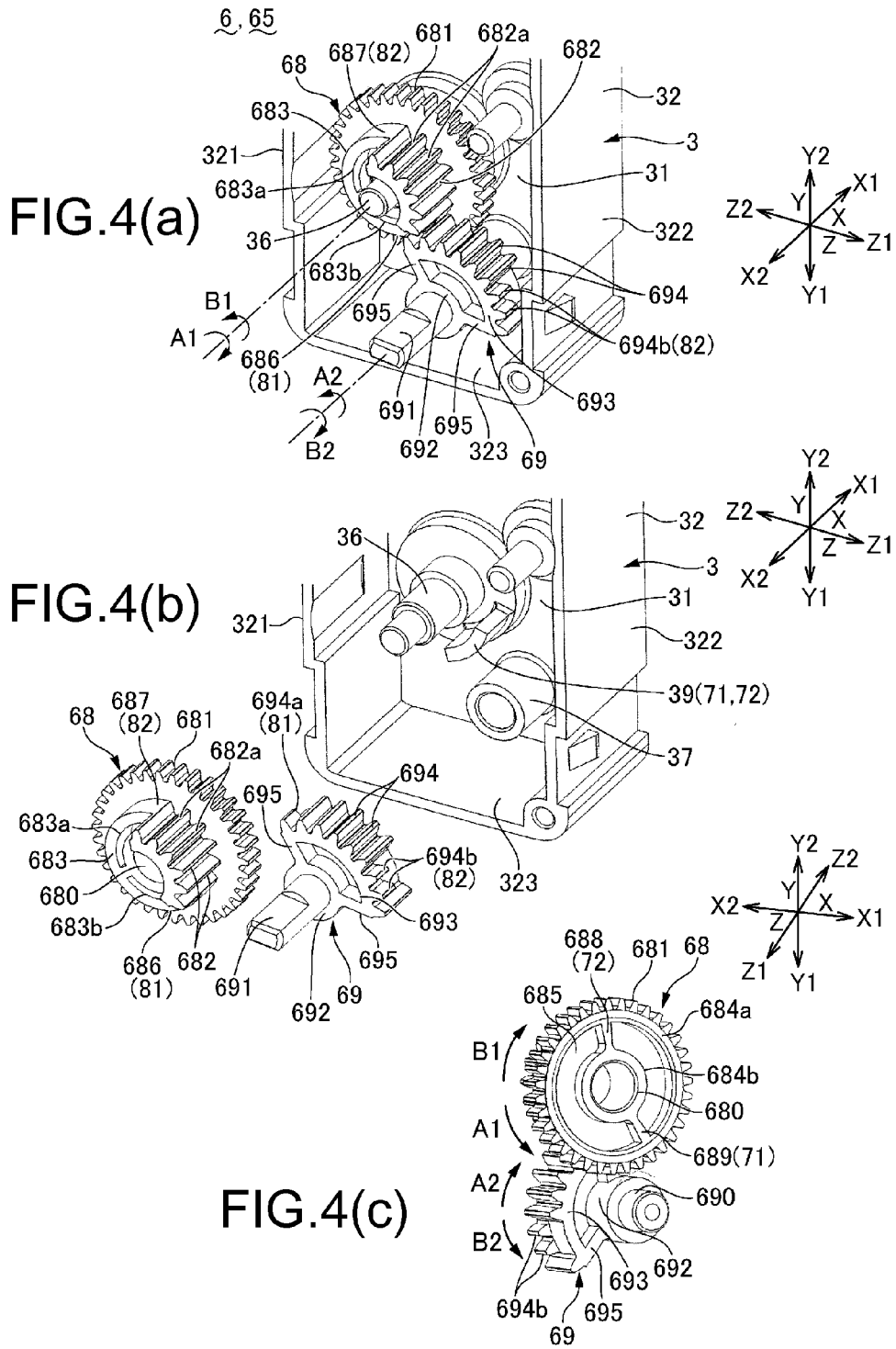
FIGS. 4(a), 4(b) and 4(c) are explanatory views showing structures of a drive gear, a sector gear and the like which are used in a drive mechanism of a damper device to which the disclosure is applied.
Figure 5:
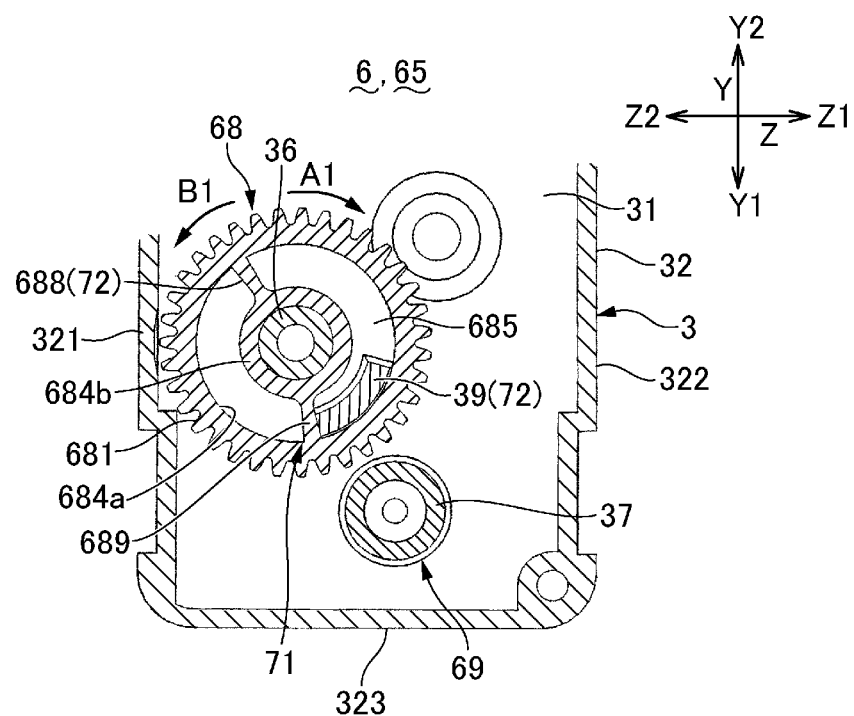
FIG. 5 is an explanatory view showing a first stopper mechanism structured in a drive mechanism of a damper device to which the disclosure is applied.

Specifically, as shown in FIG. 3, FIGS. 4(*a*), 4(*b*) and 4(*c*) and FIG. 5, when the drive gear 68 is turned in the first direction shown by the arrow "B1", the protruded part 689 of the drive gear 68 is abutted with the stopper protruded part 39 of the case 3 and further turning of the drive gear 68 is prevented. In this manner, the first stopper mechanism 71 is structured.

In this embodiment, in a plurality of the teeth 694 of the sector gear 69, a portion of the tooth 694*a* which is located at the most end position in the direction shown by the arrow "A2" is formed such that a dimension of the portion of the tooth 694*a* in the axial line direction is narrowed. Therefore, the first circular arc-shaped outer peripheral part 686 which is formed at an adjacent position in the second direction (arrow "A1" direction) with respect to the partially toothless gear 682 of the drive gear 68 and is formed so as to have the same diameter and concentrically with a tooth tip circle of the partially toothless gear 682 is entered into the narrowed portion of the tooth 694*a* and the sector gear 69 is restricted and thus turning in the direction shown by the arrow "A2" of the sector gear 69 is prevented. In this manner, the first lock mechanism 81 is structured. In this case, it may be structured that the first circular arc-shaped outer peripheral part 686 is extended in a radial direction to a position where turning of the sector gear 69 is not disturbed.

(Structures of Second Stopper Mechanism 72 and Second Lock Mechanism 82)

In this embodiment, the second stopper mechanism 72 which restricts a movable range in the second turning direction (direction shown by the arrow "A1") of the drive gear 68 when the baffle 4 is turned in an open direction is structured between the drive gear 68 and the case 3. Further, the second lock mechanism 82 is structured between the drive gear 68 and the sector gear 69 by which the baffle 4 is restricted in a stopped state at a front position before the second stopper mechanism 72 is operated.

Specifically, in a state shown in FIG. 3, FIGS. 4(*a*), 4(*b*) and 4(*c*) and FIG. 5, when the drive gear 68 is turned in the second direction shown by the arrow "A1", the protruded part 688 of the drive gear 68 is abutted with the stopper protruded part 39 of the case 3 and further turning of the drive gear 68 is prevented. In this manner, the second stopper mechanism 72 is structured.

In this embodiment, in a plurality of the teeth 694 of the sector gear 69, portions of the second and the third teeth 694*b* from the most end tooth in a direction shown by the arrow "B2" are narrowed in a dimension in the axial line direction. Therefore, the second circular arc-shaped outer peripheral part 687 which is formed at an adjacent position in the first direction (arrow "B1" direction) with respect to the partially toothless gear 682 of the drive gear 68 and is formed so as to have the same diameter and concentrically with the tooth tip circle of the partially toothless gear 682 is entered into the narrowed portions of the second and the third teeth 694*b* and the sector gear 69 is restricted and thus turning in the direction shown by the arrow "A2" and the direction shown by the arrow "B2" of the sector gear 69 is prevented. In this manner, the second lock mechanism 82 which restricts the baffle 4 in a stopped state is structured at a front position before the second stopper mechanism 72 is operated. In this case, it may be structured that the second circular arc-shaped outer peripheral part 687 is extended in a radial direction to a position where turning of the sector gear 69 is not disturbed.

Figure 6A:
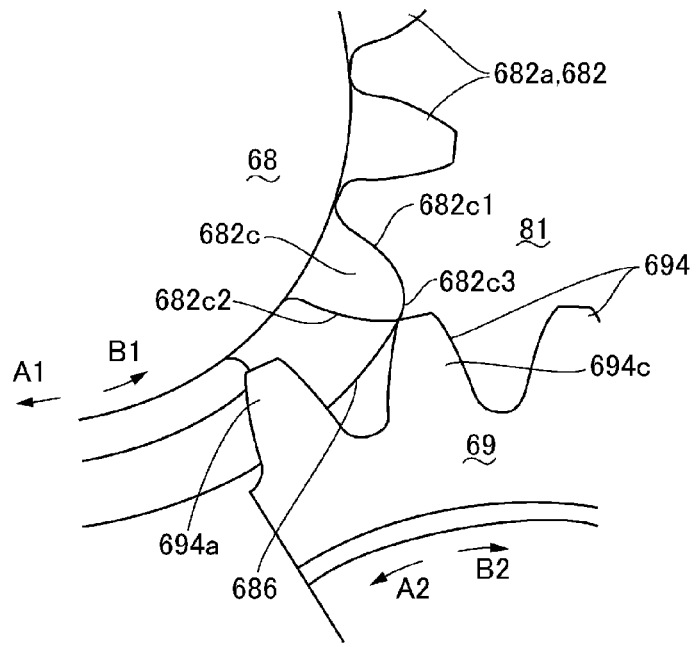
FIGS. 6(a) and 6(b) are explanatory views showing a tooth face of a tooth on the most first circular arc-shaped outer peripheral part side in a partially toothless gear of a drive gear in a damper device.

(Detailed Structure of Partially Toothless Gear of Drive Gear) FIGS. 6(*a*) and 6(*b*) are explanatory views showing a tooth face of the tooth 682*c* on the most first circular arc-shaped outer peripheral part 686 side in the partially toothless gear 682 of the drive gear 68 in the damper device 1. FIG. 6(*a*) is an explanatory enlarged view showing the tooth 682*c* on the most first circular arc-shaped outer peripheral part 686 side of the drive gear 68 and the like in the damper device 1 to which the disclosure is applied. FIG. 6(*b*) is an explanatory enlarged view showing a tooth 682*f* of the most first circular arc-shaped outer peripheral part 686 side of the drive gear 68 and the like in a damper device in accordance with a reference example. FIGS. 6(*a*) and 6(*b*) show states that the baffle 4 is located in an open state and the sector gear 69 is restricted by the first circular arc-shaped outer peripheral part 686 of the drive gear 68, i.e., by the first lock mechanism 81. FIG. 7 is a graph showing an angular variation of a common normal line of the tooth 682*c* of the drive gear 68 and the tooth 694*c* of the sector gear 69 accompanied with turning of the drive gear 68 in the damper device 1. FIG. 7 shows variations of angles of common normal lines of the teeth 682*c* and 682*f* on the most first circular arc-shaped outer peripheral part 686 sides of the drive gears 68 and the teeth 694*c* and 694*f* of the sector gears 69 having been pressure-contacted and restricted by the first circular arc-shaped outer peripheral parts accompanied with turning of the drive gear 68. Further, in FIG. 7, the position of a common normal line in a state "P0" that the sector gear 69 is restricted is determined as 0° (reference), and an angular variation of the common normal line is shown during the drive gear 68 is turned to the state "P7" from the state "P0" that the sector gear 69 is restricted. Further, in FIG. 7, the solid line "G1" indicates a case that the disclosure is applied and the solid line "G2" indicates a case of the reference example.

In the first lock mechanism 81 described with reference to FIG. 3 and the like, in this embodiment, as shown in FIG. 6(*a*), in a plurality of the teeth 682*a* structuring the partially toothless gear 682 of the drive gear 68, the tooth 682*c* on the most first circular arc-shaped outer peripheral part 686 side is formed so that a curvature of a first tooth face 682*c*1 on an opposite side to the first circular arc-shaped outer peripheral part 686 side is set to be smaller than a curvature of a second tooth face 682*c*2 on the first circular arc-shaped outer peripheral part 686 side. Further, in a tooth face of the tooth 682*c*, an outer peripheral portion 682*c*3 located on the most outer peripheral side structures a curved face which is continuously connected with the first tooth face 682*c*1 and an inflection part exists only between the outer peripheral portion 682*c*3 and the second tooth face 682*c*2. Therefore, a continuous curved face is formed from a side of the first tooth face 682*c*1 to the second tooth face 682*c*2. Therefore, as described below while comparing with the reference example shown in FIG. 6(*b*), in a case that the drive gear 68 is turned in a direction shown by the arrow "A1" from a state that the sector gear 69 is restricted by the first lock mechanism 81 and the baffle 4 is driven in an open direction, even when the baffle 4 is subjected to an urging force caused by repulsion of the elastic member 49, the sector gear 69 is not turned rapidly.

Further, in the tooth face of the tooth 682*c*, the outer peripheral portion 682*c*3 which is located on the most outer peripheral side structures a continuous curved face with the first circular arc-shaped outer peripheral part 686. Therefore, a continuous curved face is formed from a side of the first tooth face 682c1 to the first circular arc-shaped outer peripheral part 686 through the outer peripheral portion 682c3. Therefore, as described below while comparing with the reference example shown in FIG. 6(b), in a case that the drive gear 68 is turned in a direction shown by the arrow "A1" from a state that the sector gear 69 is restricted by the first lock mechanism 81 and the baffle 4 is driven in an open direction, even when the baffle 4 is subjected to an urging force caused by repulsion of the elastic member 49, the sector gear 69 is not turned rapidly.

Figure 6B:
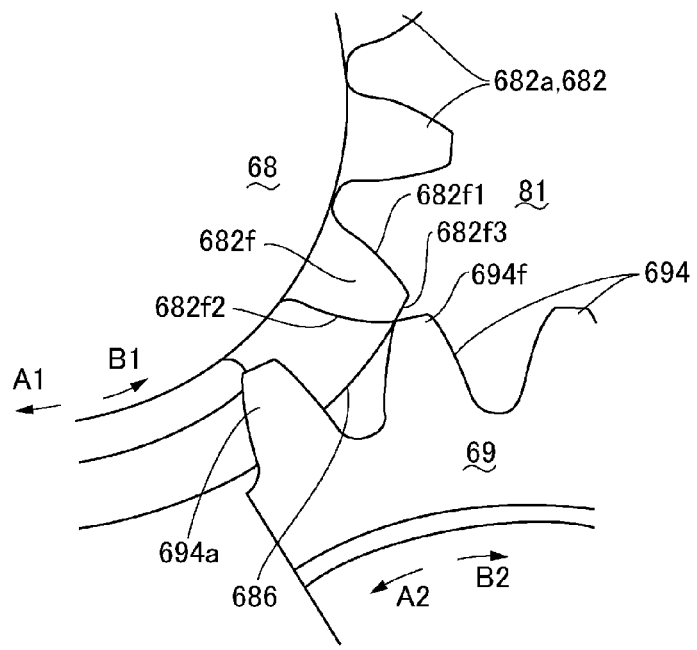
Figure 7:
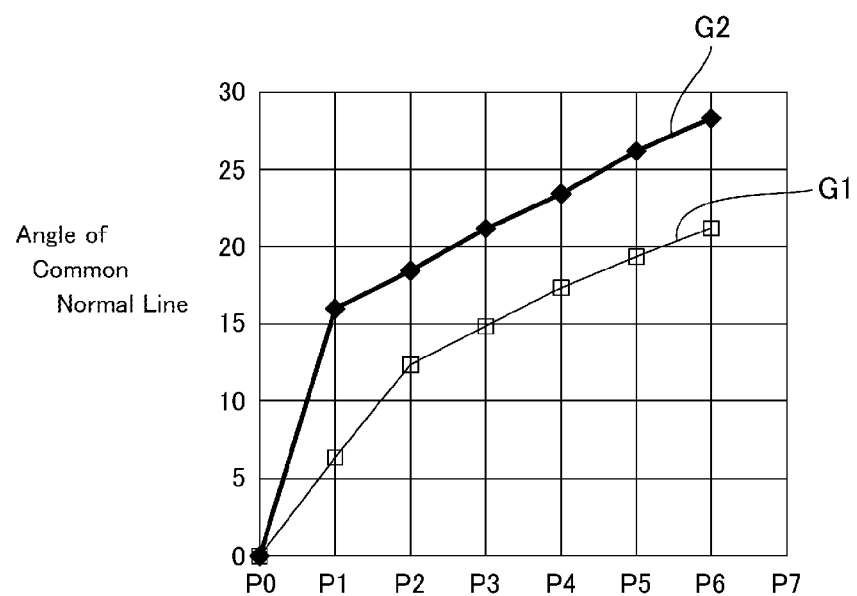
FIG. 7 is a graph showing an angular variation of a common normal line of a tooth of a drive gear and a tooth of a sector gear accompanied with turning of the drive gear in a damper device.

On the other hand, in the reference example, as shown in FIG. 6(b), in a plurality of teeth 682a structuring the partially toothless gear 682 of the drive gear 68, the tooth 682f on the most first circular arc-shaped outer peripheral part 686 side is formed so that a curvature of a first tooth face 682f1 on an opposite side to the first circular arc-shaped outer peripheral part 686 side and a curvature of a second tooth face 682f2 on the first circular arc-shaped outer peripheral part 686 side are equal to each other. Therefore, inflection parts are existed between an outer peripheral portion 682f3 located on the most outer peripheral side and the first tooth face 682f1 and between the outer peripheral portion 682f3 and the second tooth face 682f2.

According to this structure, in a state that the sector gear 69 is restricted by the first lock mechanism 81, when the drive gear 68 is turned in a direction shown by the arrow "A1" and the baffle 4 is driven in an open direction, the sector gear 69 is turned rapidly. In other words, when the baffle 4 is driven in an open direction, the tooth 682f of the drive gear 68 rides over the second tooth 694f of the sector gear 69. In this case, the baffle 4 is subjected to repulsive force of the elastic member 49 and thus the sector gear 69 is urged in an open direction shown by the arrow "A2". Therefore, the tooth 682f of the drive gear 68 intermittently collides with the second tooth 694f of the sector gear 69 and the sector gear 69 is turned rapidly. Meanwhile, as shown by the solid line "G2" in FIG. 7, a direction of the common normal line of the tooth 682f and the tooth 694f is largely varied. Therefore, an abnormal noise is occurred due to a collision of the tooth 682f with the tooth 694f and/or a collision between other members.

Also in this embodiment, in a state that the sector gear 69 is restricted by the first lock mechanism 81, when the drive gear 68 is turned in a direction shown by the arrow "A1" and the baffle 4 is driven in an open direction, the tooth 682c of the drive gear 68 rides over the second tooth 694c of the sector gear 69. However, in this embodiment, a curvature of the first tooth face 682c1 of the tooth 682c on an opposite side to the first circular arc-shaped outer peripheral part 686 side is set to be smaller than a curvature of the second tooth face 682c2 on the first circular arc-shaped outer peripheral part 686 side and a continuous curved face is formed from the side of the first tooth face 682c1 to the second tooth face 682c2. Therefore, even when the baffle 4 is subjected to repulsive force of the elastic member 49 and the sector gear 69 is urged in an open direction shown by the arrow "A2", the tooth 682c of the drive gear 68 is continuously contacted with the second tooth 694c of the sector gear 69 in substantially the same state and thus the sector gear 69 is turned gradually. Meanwhile, as shown by the solid line "G1" in FIG. 7, a direction of the common normal line of the tooth 694c and the tooth 682c is not varied largely. Therefore, an abnormal noise is restrained from being occurred due to a collision of the tooth 682c with the tooth 694c and/or a collision between other members.

(Operation and Principal Effects in this Embodiment)

As described above, in the damper device 1 in this embodiment, the first stopper mechanism 71 which restricts a movable range of the drive gear 68 in a first turning direction (direction shown by the arrow "B1") when the baffle 4 is turned in a closing direction is structured between the drive gear 68 and the case 3. Therefore, according to this embodiment, the position where the first stopper mechanism 71 is operated is set as a starting point and, when the baffle is driven in either direction of an open direction and a closing direction, a drive signal having the same number of steps is supplied to the stepping motor 60. Therefore, in a case that the opening part 210 of the frame 2 is set in a closed state by the baffle 4, even when the baffle 4 is further driven in a closing direction from a state that the baffle 4 is abutted with the frame 2, step-out of the stepping motor 60 is hard to be occurred because the number of steps is set at the time point when the first stopper mechanism 71 is operated as the starting point. Accordingly, a situation that gears of the gear train 65 are momentarily reversed is hard to be occurred due to step-out and thus an abnormal noise caused by a collision between the teeth can be restrained.

Further, in this embodiment, in a case that the baffle 4 sets the opening part 210 in a closed state, a portion of the baffle 4 which contacts with frame 2 is made of the elastic member 49, and the elastic member 49 is elastically deformed by contacting with the frame 2 in a state that the opening part 210 is closed by the baffle 4. Therefore, the opening part 210 can be surely set in a closed state. In this case, when the opening part 210 of the frame 2 is to be set in a closed state by the baffle 4, the seal plate part 26 is pressed and entered into the elastic member 49 and thus, the baffle 4 is further driven in a closing direction from a state that the baffle 4 is abutted with the frame 2. Even in this structure, according to this embodiment, the number of steps is set with the time point when the first stopper mechanism 71 is operated as the starting point and thus an entering degree of the seal plate part 26 into the elastic member 49 is restricted by the first stopper mechanism 71. Therefore, the step-out of the stepping motor 60 is hard to be occurred.

Further, the first lock mechanism 81 which prevents turning of the sector gear 69 in a direction that the baffle 4 is going to turn in an open direction in a state that the first stopper mechanism 71 is operated is structured between the drive gear 68 and the sector gear 69. Therefore, even when force for turning the baffle 4 in an open direction is acted by fluid pressure of cold air in a state that the baffle 4 is located in a closing posture, turning of the sector gear 69 is prevented by the first lock mechanism 81. Therefore, the baffle 4 is hard to be displaced from the state in the closing posture. Further, even when the baffle 4 is going to be turned in a closing direction, turning of the sector gear 69 is prevented by the first stopper mechanism 71 through the drive gear 68. Therefore, it is sufficient that the first lock mechanism 81 prevents turning of the sector gear 69 toward one side. Accordingly, in the sector gear 69, it is sufficient that a dimension in an axial line direction of the tooth 694a located on the most end side in a circumferential direction is narrowed and thus a portion of the sector gear required to structure the first lock mechanism 81 can be made narrow. As a result, the size of the sector gear 69 can be reduced.

In this embodiment, in order to structure the first lock mechanism 81, in a plurality of the teeth 682a structuring the partially toothless gear 682 of the drive gear 68, the tooth 682c on the most first circular arc-shaped outer peripheral part 686 side is formed so that a curvature of the first tooth face 682c1 on an opposite side to the first circular arc-shaped outer peripheral part 686 side is set to be smaller than a curvature of the second tooth face 682c2 on the first circular arc-shaped outer peripheral part 686 side and a continuously curved face is formed from the side of the first tooth face 682c1 to the second tooth face 682c2. Therefore, in a state that the sector gear 69 is restricted by the first lock mechanism 81, when the drive gear 68 is turned in a direction shown by the arrow "A1" and the baffle 4 is driven in an open direction, even when the baffle 4 is subjected to an urging force due to repulsion of the elastic member 49, the tooth 682c of the drive gear 68 is continuously contacted with the second tooth 694c of the sector gear 69 in substantially the same state and thus the sector gear 69 is turned gradually. Accordingly, an abnormal noise is restrained from occurring due to a collision of the tooth 682c with the tooth 694c and/or a collision between other members.

Further, the second stopper mechanism 72 is structured which restricts a movable range of the drive gear 68 in the second turning direction when the baffle 4 is turned in an open direction. The movable range of the baffle 4 is set from the position where the first stopper mechanism 71 is operated to the front position before the second stopper mechanism 72 is operated by the number of steps of the stepping motor 60 with the first stopper mechanism 71 as the starting point. Therefore, even in a case that the baffle 4 is running out of control in an open direction, the run-away of the baffle 4 can be prevented by the second stopper mechanism 72. Further, normally, the movable range of the drive gear 68 is set at the front position before the second stopper mechanism 72 is operated and thus a situation that the second stopper mechanism 72 is operated to cause step-out of the stepping motor 60 is hard to be occurred.

Further, the second lock mechanism 82 which holds the sector gear 69 in a stopped state at the front position before the second stopper mechanism 72 is operated is structured between the drive gear 68 and the sector gear 69. Therefore, the baffle 4 in the open posture can be restrained from flapping due to fluid pressure.

(Other Embodiments)

Although the disclosure has been shown and described with reference to a specific embodiment, various changes and modifications will be apparent to those skilled in the art from the teachings herein. For example, in the embodiment described above, the disclosure is applied to the lock mechanism which holds the baffle 4 in a closed position, but the disclosure may be applied to a lock mechanism which holds the baffle 4 in an open position. Further, for example, a structure may be adopted that the baffle 4 is urged by a tension coil spring or the like as the lock mechanism which holds the baffle 4 in an open posture. Further, the damper device 1 in the embodiment described above is used in a refrigerator but the disclosure is not limited to a damper device used in a refrigerator.

The invention claimed is:

1. A damper device comprising:
a frame in which an opening part is formed;
a baffle configured to open and close the opening part;
a drive mechanism structured to drive the baffle; and
a case which accommodates the drive mechanism;
wherein the drive mechanism comprises a stepping motor and a gear train structured to transmit rotation of the stepping motor;
wherein the gear train comprises a drive gear and a sector gear engaged with the drive gear and driven by the drive gear;
wherein a first lock mechanism is structured between the drive gear and the sector gear at a movement restricted position in one of a closing direction and an open direction of the baffle, and the first lock mechanism prevents turning of the sector gear to the other of the closing direction and the open direction of the baffle;
wherein the first lock mechanism is structured so that a first circular arc-shaped outer peripheral part of the drive gear concentrically formed so as to have the same or larger diameter than a tooth tip circle of a partially toothless gear engaged with the sector gear and disposed at a position adjacent in a circumferential direction to the partially toothless gear is entered into a portion of a tooth whose dimension in an axial line direction is narrowed of a plurality of teeth of the sector gear engaged with the drive gear and thereby the sector gear is restricted; and
wherein a tooth on a most first circular arc-shaped outer peripheral part side of the partially toothless gear is formed so that a curvature of a first tooth face on an opposite side to a first circular arc-shaped outer peripheral part side is smaller than a curvature of a second tooth face on the first circular arc-shaped outer peripheral part side.

2. The damper device according to claim 1, wherein a tooth face of the tooth on the most first circular arc-shaped outer peripheral part side of the partially toothless gear is formed in a continuously curved face from a side of the first tooth face to the second tooth face.

3. The damper device according to claim 2, wherein the tooth face of the tooth on the most first circular arc-shaped outer peripheral part side of the partially toothless gear is formed in a continuously curved face from the side of the first tooth face to the first circular arc-shaped outer peripheral part.

4. The damper device according to claim 3, wherein the first lock mechanism prevents turning of the sector gear at the movement restricted position in the closing direction of the baffle.

5. The damper device according to claim 4, wherein
a portion of the baffle contacting with the frame when the baffle sets the opening part in a closed state is made of an elastic member, and
the elastic member is elastically deformed by contacting with the frame in a state that the opening part is closed by the baffle.

6. The damper device according to claim 5, wherein
a first stopper mechanism is structured between the drive gear and the case and the first stopper mechanism restricts a movable range in a first turning direction of the drive gear when the baffle is turned in the closing direction, and
the first lock mechanism is structured so that a dimension in an axial line direction of a tooth at the most end position in a circumferential direction of the plurality of the teeth of the sector gear engaged with the drive gear is narrowed.

7. The damper device according to claim 6, further comprising a second stopper mechanism which restricts a movable range in a second turning direction of the drive gear when the baffle is turned in the open direction,
wherein the movable range of the baffle set in a range from a position where the first stopper mechanism is operated to a front position before the second stopper mechanism is operated.

8. The damper device according to claim 7, wherein
a bottom plate part of the case is formed with a stopper protruded part,
the drive gear is formed with a protruded part, and the first stopper mechanism and the second stopper mechanism are structured of the stopper protruded part and the protruded part.

9. The damper device according to claim 7, wherein
a second lock mechanism is structured between the drive gear and the sector gear for holding the sector gear in a stopped state at the front position, and
the second lock mechanism is structured so that a second circular arc-shaped outer peripheral part of the drive gear concentrically formed so as to have the same or larger diameter than the tooth tip circle of the partially toothless gear engaged with the sector gear and disposed at a position adjacent in the circumferential direction to the partially toothless gear is entered into a portion of a tooth whose dimension in an axial line direction is narrowed of the plurality of the teeth of the sector gear engaged with the drive gear and thereby the sector gear is restricted.

10. The damper device according to claim 9, wherein
the drive gear is formed with a circular arc-shaped protruded part lower than a dimension in the axial line direction of the partially toothless gear on an opposite side to the partially toothless gear,
the circular arc-shaped protruded part is connected from the first circular arc-shaped outer peripheral part to the second circular arc-shaped outer peripheral part, and
an outer peripheral face of the circular arc-shaped protruded part is provided with the same or larger diameter than the tooth tip circle of the partially toothless gear and formed concentrically with the tooth tip circle.

11. The damper device according to claim 1, wherein the sector gear is an output gear connected with the baffle.

12. The damper device according to claim 1, wherein an imaginary line which connects a turning center position of the drive gear and a turning center position of he sector gear is obliquely extended for all of four side plate parts of the case which surround the drive mechanism.

13. The damper device according to claim 1, wherein a pitch circle radius of a large diameter gear of a first gear engaged with a motor pinion of the stepping motor is set so that a length obtained by adding a pitch circle radius of the motor pinion to the pitch circle radius of the large diameter gear of the first gear is larger than a length obtained by adding a radius of the stepping motor and a pitch circle radius of a small diameter gear of the first gear.

14. The damper device according to claim 1, wherein the first lock mechanism prevents turning of the sector gear at the movement restricted position in the closing direction of the baffle.

15. The damper device according to claim 14, wherein
a portion of the baffle contacting with the frame when the baffle sets the opening part in a closed state is made of an elastic member, and
the elastic member is elastically deformed by contacting with the frame in a state that the opening part is closed by the baffle.

16. The damper device according to claim 15, wherein
a first stopper mechanism is structured between the drive gear and the case and the first stopper mechanism restricts a movable range in a first turning direction of the drive gear when the baffle is turned in the closing direction, and
the first lock mechanism is structured so that a dimension in an axial line direction of a tooth at the most end position in a circumferential direction of the plurality of the teeth of the sector gear engaged with the drive gear is narrowed.

17. The damper device according to claim 16, further comprising a second stopper mechanism which restricts a movable range in a second turning direction of the drive gear when the baffle is turned in the open direction,
wherein the movable range of the baffle set in a range from a position where the first stopper mechanism is operated to a front position before the second stopper mechanism is operated.

18. The damper device according to claim 3, wherein
a first stopper mechanism is structured between the drive gear and the case and the first stopper mechanism restricts a movable range in a first turning direction of the drive gear when the baffle is turned in the closing direction, and
the first lock mechanism is structured so that a dimension in an axial line direction of a tooth at the most end position in a circumferential direction of the plurality of the teeth of the sector gear engaged with the drive gear is narrowed.

19. The damper device according to claim 18, further comprising a second stopper mechanism which restricts a movable range in a second turning direction of the drive gear when the baffle is turned in the open direction,
wherein the movable range of the baffle set in a range from a position where the first stopper mechanism is operated to a front position before the second stopper mechanism is operated.

20. The damper device according to claim 19, wherein
a bottom plate part of the case is formed with a stopper protruded part,
the drive gear is formed with a protruded part, and
the first stopper mechanism and the second stopper mechanism are structured of the stopper protruded part and the protruded part.

21. The damper device according to claim 19, wherein
a second lock mechanism is structured between the drive gear and the sector gear for holding the sector gear in a stopped state at the front position, and
the second lock mechanism is structured so that a second circular arc-shaped outer peripheral part of the drive gear concentrically formed so as to have the same or larger diameter than the tooth tip circle of the partially toothless gear engaged with the sector gear and disposed at a position adjacent in the circumferential direction to the partially toothless gear is entered into a portion of a tooth whose dimension in an axial line direction is narrowed of the plurality of the teeth of the sector gear engaged with the drive gear and thereby the sector gear is restricted.

* * * * *